(12) United States Patent
Takahashi

(10) Patent No.: US 7,484,779 B2
(45) Date of Patent: Feb. 3, 2009

(54) BUMPER STRUCTURE

(75) Inventor: Hiroyuki Takahashi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 75 days.

(21) Appl. No.: 11/666,622

(22) PCT Filed: May 15, 2006

(86) PCT No.: PCT/IB2006/001322

§ 371 (c)(1),
(2), (4) Date: Apr. 30, 2007

(87) PCT Pub. No.: WO2006/123236

PCT Pub. Date: Nov. 23, 2006

(65) Prior Publication Data

US 2008/0203742 A1    Aug. 28, 2008

(30) Foreign Application Priority Data

May 20, 2005    (JP)    ............................. 2005-148382

(51) Int. Cl.
*B60R 19/48* (2006.01)
(52) U.S. Cl. .................................................... 293/117
(58) Field of Classification Search ............ 296/203.02, 296/187.09, 187.04; 293/117, 102, 133, 293/132, 120; 180/271
See application file for complete search history.

(56) References Cited

U.S. PATENT DOCUMENTS

| | | | | |
|---|---|---|---|---|
| 4,457,547 | A * | 7/1984 | Sekiyama et al. ........... 293/132 |
| 5,201,912 | A * | 4/1993 | Terada et al. ................ 293/132 |
| 6,481,690 | B2 * | 11/2002 | Kariatsumari et al. ....... 293/102 |
| 6,561,301 | B1 | 5/2003 | Hattori et al. |
| 7,226,097 | B2 * | 6/2007 | Adachi et al. ............... 293/117 |
| 7,293,809 | B2 * | 11/2007 | Suzuki et al. ............... 293/117 |
| 7,308,380 | B2 * | 12/2007 | Tanabe ........................ 180/271 |
| 7,364,222 | B2 * | 4/2008 | Tanabe .................. 296/187.09 |
| 2005/0200139 | A1 * | 9/2005 | Suzuki ........................ 293/117 |
| 2007/0046044 | A1 * | 3/2007 | Tanabe ........................ 293/120 |
| 2007/0108779 | A1 * | 5/2007 | Zacheiss et al. ............. 293/120 |
| 2007/0114803 | A1 * | 5/2007 | Takahashi et al. ........... 293/102 |
| 2007/0132565 | A1 * | 6/2007 | Tanabe ........................ 340/436 |

(Continued)

FOREIGN PATENT DOCUMENTS

CN    1468761 A    1/2004

(Continued)

*Primary Examiner*—Kiran B. Patel
(74) *Attorney, Agent, or Firm*—Oliff & Berridge, PLC

(57) ABSTRACT

In a bumper, a touch sensor and a load detection sensor detect a load applied to the bumper in the event of a head-on collision, when pressed by an absorber. The touch sensor and the load detection sensor are provided in front of reinforced portions of a front wall of a bumper reinforcement. The touch sensor is provided in front of the load detection sensor with a load transfer plate interposed the touch sensor and the load detection sensor. In addition, in the event of a head-on collision, deformation of the front wall is suppressed by the reinforced portions and the load is appropriately applied to the touch sensor and the load detection sensor, and the load is appropriately applied from the touch sensor to the load detection sensor. Thus, the detection performance of the touch sensor and the load detection sensor can be stabilized.

11 Claims, 2 Drawing Sheets

U.S. PATENT DOCUMENTS

2007/0273166 A1 * 11/2007 Tanabe ................. 293/102

FOREIGN PATENT DOCUMENTS

| DE | 102 61 859 A1 | 7/2004 |
| DE | 10 2004 005 566 A1 | 8/2005 |
| JP | A-04-218446 | 8/1992 |
| JP | A-2000-131157 | 5/2000 |
| JP | A-2000-225907 | 8/2000 |
| JP | A 2000-225907 | 8/2000 |
| JP | A-2004-025981 | 1/2004 |
| JP | A-2004-025984 | 1/2004 |
| JP | A 2004-268627 | 9/2004 |
| JP | A 2004-317247 | 11/2004 |
| JP | A-2006-282114 | 10/2006 |
| WO | WO 2005/061284 | 7/2005 |
| WO | WO 2005/082677 A1 | 9/2005 |

* cited by examiner

BUMPER STRUCTURE

BACKGROUND OF THE INVENTION

1. Field of the Invention

The invention relates to a structure of a bumper for a vehicle.

2. Description of the Related Art

Japanese Patent Application Publication No. JP-A-2000-225907 describes a bumper structure in which a collision detection sensor is provided between a shock absorber and a reinforcement member of a bumper.

However, this publication does not describe usage of multiple (particularly, multiple types of) collision detection sensors.

SUMMARY OF THE INVENTION

It is an object of the invention to provide a bumper structure that stabilizes the detection performance of multiple detecting means (or multiple types of detecting means).

A first aspect of the invention relates to a bumper structure. The bumper structure includes a bumper reinforcement provided in a bumper of a vehicle; a reinforced portion that is formed within the bumper reinforcement and that reinforces the bumper reinforcement; and multiple detecting means that are provided outboard of the reinforced portion, and that detect one of a load and pressure applied to the bumper.

In the bumper structure described above, the bumper reinforcement is provided in the bumper of the vehicle, and the reinforced portion is formed to reinforce the bumper reinforcement. In addition, the multiple detecting means detect one of the load and pressure applied to the bumper.

In the structure described above, the multiple detecting means are provided outboard of the reinforced portion. In addition, the reinforcement portion suppresses deformation of the bumper reinforcement when a load or the pressure is applied to the bumper. Accordingly, the load or the pressure applied to the bumper can be appropriately applied to the multiple detecting means. Thus, the detection performance of the multiple detecting means can be stabilized.

In the bumper structure described above, the multiple detecting means may include first detecting means and second detecting means. The second detecting means may be provided directly outboard of the first detecting means or provided outboard of the first detecting means with a rigid body interposed between the second detecting means and the first detecting means, and detect one of the load and pressure applied to the bumper.

In the bumper structure described above, the bumper reinforcement is provided in the bumper of the vehicle. In addition, the first detecting means and the second detecting means detect the load or the pressure applied to the bumper.

In the bumper structure described above, the first detecting means is provided outboard of the reinforced portion of the bumper reinforcement, and the second detecting means is provided directly outboard of the first detecting means or provided outboard of the first detecting means with the rigid body interposed between the first detecting means and the second detecting means. Therefore, when the load or the pressure is applied to the bumper, the load or the pressure applied to the bumper is appropriately applied from the second detecting means to the first detecting means. Thus, the detection performance of the first detecting means and the second detecting means can be stabilized.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein:

FIG. 2 illustrates the cross-sectional view of the bumper according to the embodiment of the invention, viewed from the left side of the vehicle, when a vehicle collides head-on.

DETAILED DESCRIPTION OF THE EXAMPLE EMBODIMENTS

Figure 1:
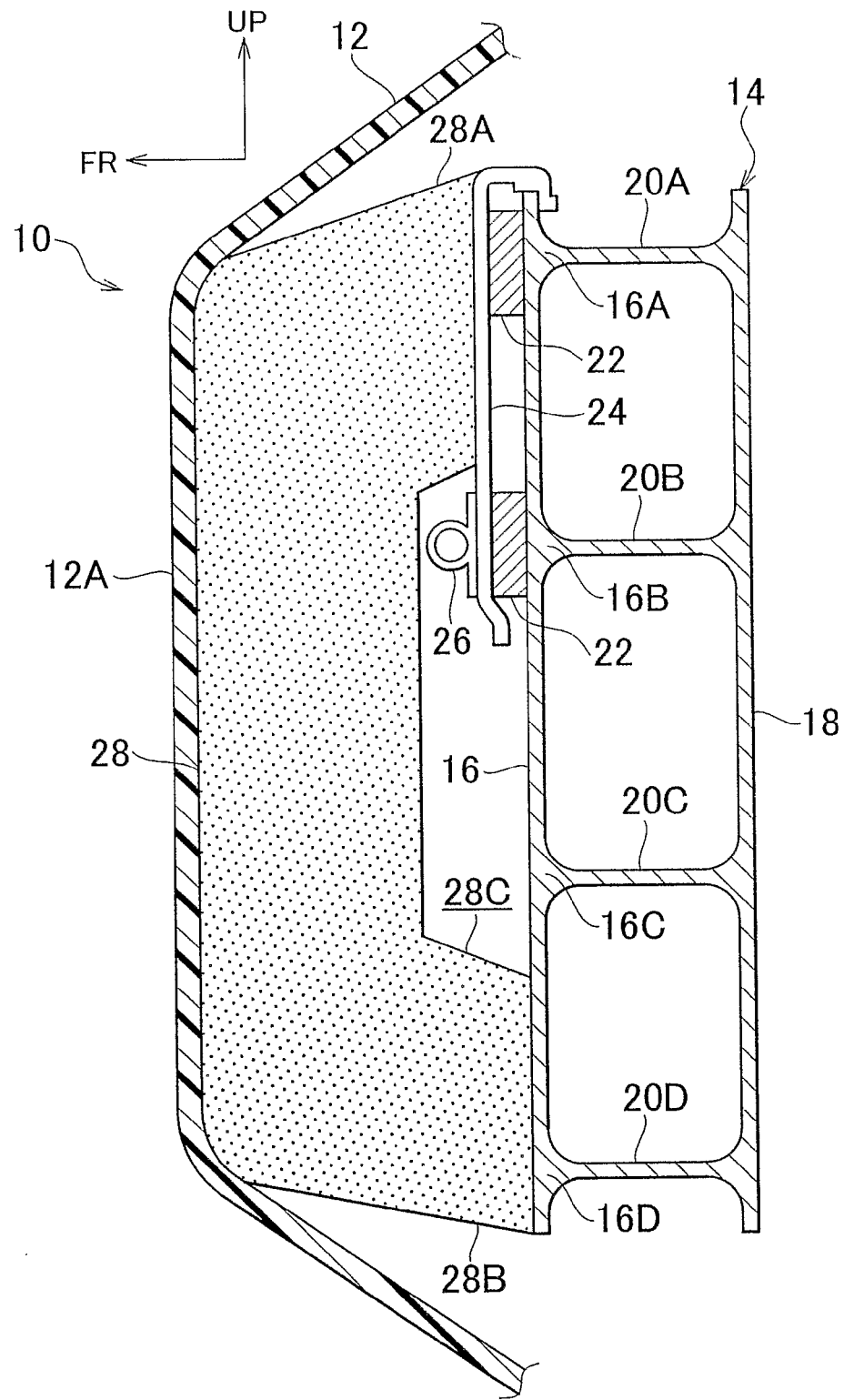
FIG. 1 illustrates the cross-sectional view of a bumper according to an embodiment of the invention, viewed from the left side of a vehicle.

FIG. 1 illustrates the cross-sectional view of a bumper 10 according to an embodiment of the invention, viewed from the left side of a vehicle. In FIG. 1, the arrow FR indicates the front of a vehicle, and the arrow UP indicates the top-side of the vehicle.

The bumper 10 according to the embodiment is provided at the front-end of the vehicle, and extends along the front of the vehicle. Both ends of the bumper 10 are curved toward the rear of the vehicle.

The bumper 10 is provided with a bumper cover 12 that has a substantially U-shaped cross section. The bumper cover 12 configures the design of the bumper 10. The bumper cover 12 extends along the front of the vehicle. Both ends of the bumper cover 12 are curved toward the rear of the vehicle in accordance with the curvature of the both ends the bumper 10.

A bumper reinforcement 14 is provided inside of the bumper cover 12, at the position closer to the rear of the vehicle than a position, at which there is no bumper reinforcement 14, is. The bumper reinforcement 14 reinforces the bumper 10, and extends along the front of the vehicle. Both ends of the bumper reinforcement 14 are curved toward the rear of the vehicle in accordance with the curvature of the both ends of the bumper 10. Paired side members (not shown), which extend in the longitudinal direction of the vehicle, are provided on the right side and the left side of the front portion of the vehicle, respectively. The bumper reinforcement 14 is fixed to front ends of the side members.

The bumper reinforcement 14 includes a front wall 16 and a rear wall 18. The surface of the front wall 16 extends perpendicularly to the longitudinal direction of the vehicle. The surface of the rear wall 18 extends perpendicularly to the longitudinal direction of the vehicle. The front wall 16 is closer to the front of the vehicle than the rear wall 18 is. The rear wall 18 is closer to the rear of the vehicle than the front wall 16 is. The front wall 16 and the rear wall 18 are connected to each other by a predetermined number (four, in the embodiment) of reinforcement plates 20A to 20D that extend perpendicularly to the front wall 16 and the rear wall 18. The predetermined number of reinforcement plates 20A to 20D are arranged at predetermined intervals in the vertical direction of the vehicle. The first top reinforcement plate 20A connects the upper end of the front wall 16 to the upper end of the rear wall 18. The first bottom reinforcement plate 20D connects the lower end of the front wall 16 to the lower end of the rear wall 18. Thus, the front wall 16 is reinforced at portions at which the front wall 16 is connected to the reinforcement plates 20A to 20D (hereinafter, these portions will be referred to as "reinforced portions 16A to 16D").

As first detecting means, a predetermined number (two, in the embodiment) of load detection sensors (or pressure detection sensors) 22 may be provided in front of the front wall 16 of the bumper reinforcement 14. For example, one of the load detection sensors 22 may be fixed directly to the front surface of the front wall 16 at the position corresponding to the first top reinforced portion 16A. The other load detection sensor 22 may be fixed directly to the front surface of the front wall 16 at the position corresponding to the second top reinforced portion 16B. Each load detection sensor (or pressure detection sensor) 22 detects a load (or pressure) applied thereto, as a numerical value. Thus, each load detection sensor (or pressure detection sensor) 22 detects a load (or pressure) applied to the bumper 10.

A rigid load transfer plate 24 is also provided in front of the front wall 16 of the bumper reinforcement 14. The load transfer plate 24 is directly fixed to the front surfaces of the load detection sensors 22. The load transfer plate 24 transfers the load applied to the bumper 10 to the load detection sensors 22. Also, the load transfer plate 24 can be moved toward the rear of the vehicle with respect to the bumper reinforcement 14.

As second detecting means, a predetermined number (one, in the embodiment) of touch sensor 26 may be provided in front of the load detection sensor 22. The touch sensor 26 is directly fixed to the front surface of the load transfer plate 24 at the position corresponding to the second top reinforced portion 16B of the front wall 16 as well as the second top load detection sensor 22. When the load applied to the touch sensor 26 is equal to or higher than a predetermined load (threshold value), the touch sensor 26 is turned ON, and detects the load applied to the bumper 10. In the embodiment, the load detection sensors 22 and the touch sensor 26 are provided such that the center of the first top load detection sensor 22 corresponds to the center of the reinforced portion 16A at which the first top reinforcement plate 20A is connected to the front wall 16, and the center of the second top load detection sensor 22/touch sensor 26 corresponds to center of the reinforced portion 16B at which the second top reinforcement plate 20B is connected to the front wall 16. However, the positional relationship between the load detection sensors 22/touch sensor 26 and the front wall 16 is not limited to this. The center of the first top load detection sensor 22 may be at any positions corresponding to the reinforced portion 16A at which the first top reinforcement plate 20A is connected to the front wall 16, and the center of the second top load detection sensor 22/touch sensor 26 may be at any positions corresponding to the reinforced portion 16B at which the second top reinforcement plate 20B is connected to the front wall 16.

An absorber 28 (foam material), serving as a compressible member, is provided in front of the bumper reinforcement 14 (front wall 16). The absorber 28 is provided between the front wall 16 of the bumper reinforcement 14 and the inner surface of the wall 12A of the bumper cover 12. The absorber 28 has a substantially U-shaped cross section. The upper portion and the lower portion of the absorber 28 project toward the rear of the vehicle. An upper projection portion 28A of the absorber 28 is fixed onto the load transfer plate 24 above the touch sensor 26. A lower projection portion 28B of the absorber 28 is fixed onto the lower portion of the front wall 16 of the bumper reinforcement 14. Thus, the absorber 28 is fixed onto the inner surface of the bumper cover 12. The absorber 28 is an impact energy absorber that absorbs impact energy.

Next, the effects of the embodiment will be described.

Figure 2:
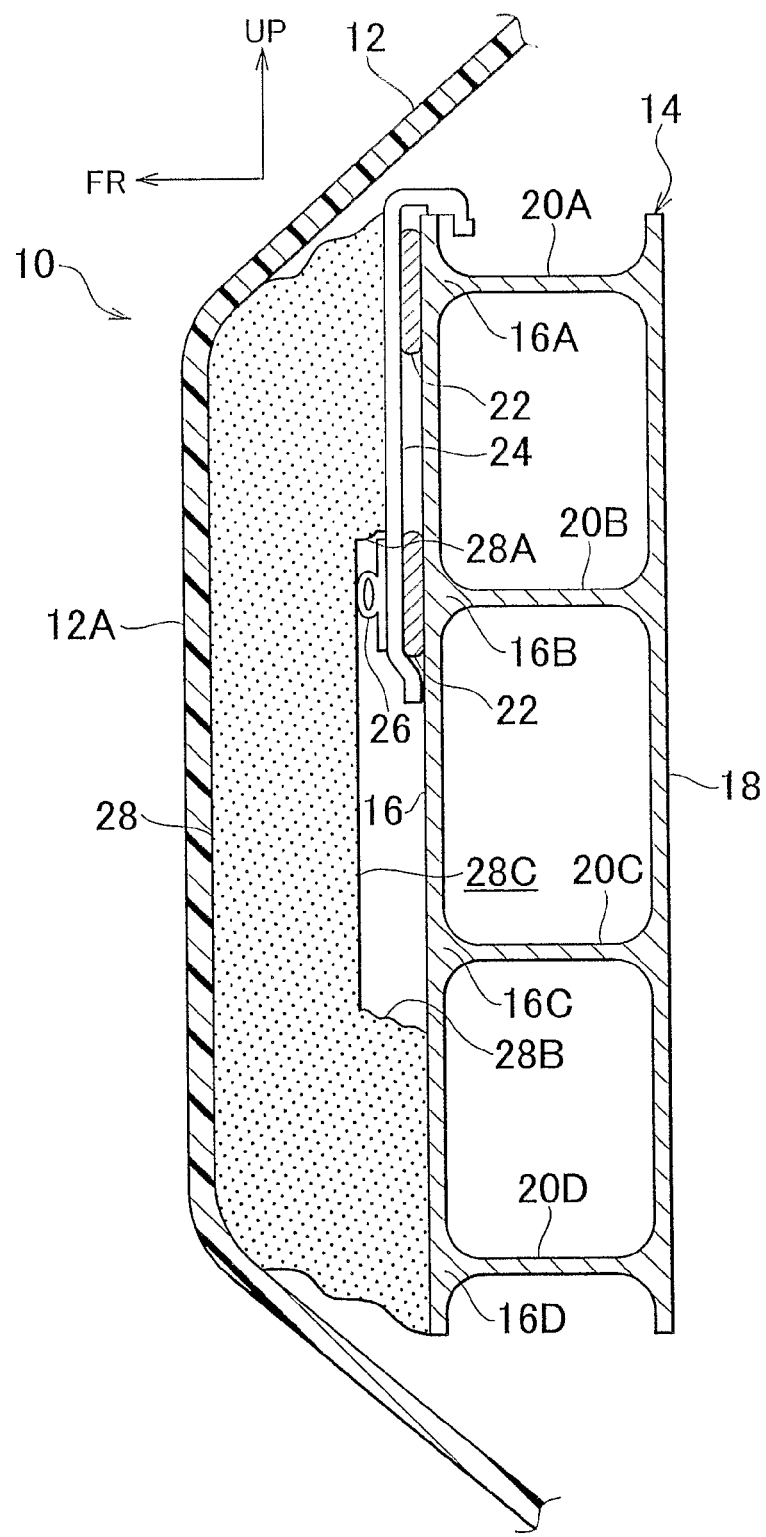

In the bumper 10 having the structure described above, as shown in FIG. 2, when the vehicle collides head-on, a load applied to the bumper 10 is transferred toward the rear of the vehicle. The bumper cover 12 deforms toward the rear of the vehicle or ruptures. Also, the absorber 28 is compressed and deforms toward the rear of the vehicle. In addition, the touch sensor 26 is pressed toward the rear of the vehicle by the compression of the absorber 28 and the load is applied to the touch sensor 26. Then, the first top load detection sensor 22 is pressed toward the rear of the vehicle by the absorber 28 via the load transfer plate 24, and the load is applied to this load detection sensor 22. The second top load detection sensor 22 is pressed toward the rear of the vehicle by the absorber 28 via the touch sensor 26 and the load transfer plate 24, and the load is applied to this load detection sensor 22. In this manner, the touch sensor 26 and the load detection sensors 22 detect the load applied to the bumper 10.

The first top load detection sensor 22 is provided in front of the front wall 16 of the bumper reinforcement 14, at the position corresponding to the first top reinforced portion 16A. The second top load detection sensor 22 and the touch sensor 26 are provided in front of the front wall 16 of the bumper reinforcement 14, at the position corresponding to the second top reinforced portion 16B. When the vehicle collides head-on and a load is applied to the bumper 10, rearward deformation of the bumper reinforcement 14 (front wall 16) is suppressed by the reinforced portions 16A to 16D. Also, the load detection sensors 22 and the touch sensor 26 are arranged such that the center of the first top load detection sensor 22 corresponds to the reinforced portion 16A at which the first top reinforcement plate 20A is connected to the front wall 16, and the center of the second top load detection sensor 22/touch sensor 26 corresponds to the reinforced portion 16B at which the second top reinforcement plate 20B is connected to the front wall 16. Accordingly, the load applied to the bumper 10 is appropriately applied to the touch sensor 26 and the load detection sensors 22. Thus, the touch sensor 26 is turned ON at the appropriate time, and the load detection sensor 22 detects an accurate load value. Thus, the detection performance of the touch sensor 26 and the load detection sensors 22 can be stabilized. When the touch sensor 26 and the load detection sensors 22 are provided in front of the front wall 16 of the bumper reinforcement 14, at the portions which do not correspond to the reinforced portions 16A to 16D, these portions of the front wall 16, which do not corresponds to the reinforced portions 16A to 16D, deform toward the rear of the vehicle (especially, the curved portions of the end portions of the bumper reinforcement 14 easily deform toward the rear of the vehicle). Accordingly, the load applied to the bumper 10 is not appropriately applied to either the touch sensor 26 or the load detection sensors 22. When either the load detection sensors 22 or the touch sensor 26 are/is provided in front of the front wall 16, at the position(s) corresponding to the reinforced portion(s) 16A to 16D, if the vehicle collides head-on and a load is applied to the bumper 10, rearward deformation of the bumper reinforcement 14 (front wall 16) is suppressed by the reinforced portions 16A to 16D. Accordingly, the load applied to the bumper 10 is appropriately applied to the touch sensor 26 and the load detection sensors 22 that is (are) provided at the position(s) corresponding to the reinforced portion(s).

The touch sensor 26 is provided in front of the second top load detection sensor 22, with the rigid (non-compressible) load transfer plate 24, not non-rigid absorber 28 or the like, interposed between the touch sensor 26 and the second top load detection sensor 22. Also, the center of the first top load detection sensor 22 corresponds to the reinforced portion 16A at which the first top reinforcement plate 20A is connected to the front wall 26, and the center of the second top load detection sensor 22/touch sensor 26 corresponds to the reinforced portion 16B at which the second top reinforcement plate 20B is connected to the front wall 26. Accordingly, in the event of a head-on collision, a load is appropriately applied from the bumper 10 to the load detection sensor 22 via the touch sensor 26. Thus, the touch sensor 26 is turned ON at a more appropriate time, and the load detection sensor 22 can detect a more accurate load value. Accordingly, the detection performance of the touch sensor 26 and the load detection sensor 22 can be more stabilized. When the touch sensor 26 is provided to a portion of the load transfer plate 24, which does not correspond to front surface of the load detection sensor 22, the portion of the load transfer plate 24, which does not correspond to the front surface of the load detection sensor 22, deforms toward the rear of the vehicle. Accordingly, the load applied to the bumper 10 is not appropriately applied to the touch sensor 26 and the load detection sensor 22. In particular, when the load transfer plate 24 deforms toward the rear of the vehicle and contacts the front wall 16 of the bumper reinforcement 14, the load, that has caused such deformation and contact, is not appropriately applied to the load detection sensor 22.

In the embodiment, the reinforced portions 16A to 16D are formed by connecting the reinforcement plates 20A to 20D to the front wall 16 of the bumper reinforcement 14, respectively. Alternatively, the reinforced portions 16A to 16D may be formed by partially increasing the thickness of the front wall 16 of the bumper reinforcement 14.

In the embodiment, the touch sensor 26 is provided in front of the second top load detection sensor 22. Alternatively, the touch sensor 26 may be provided in front of the first top load detection sensor 22.

In the embodiment, the touch sensor 26 is provided in front of the load detection sensor 22, with the load transfer plate 24 interposed between the load detection sensor 22 and the touch sensor 26. However, the touch sensor 26 may be directly provided onto the front surface of the load detection sensor 22.

In the embodiment, the bumper structure according to the invention is applied to the bumper 10 provided at the front-end of the vehicle. However, the bumper structure according to the invention may be applied to a bumper provided at the rear-end of the vehicle. In this case, the load detection sensors 22 and the touch sensor 26 are provided on the rear side of the reinforced portions. Regardless of whether the bumper structure is applied to the bumper provided at the front end or the rear end of the vehicle, the load detection sensors 22 and the touch sensor 26b are provided onto the front surface of the reinforced portions.

The invention claimed is:

1. A bumper structure, characterized by comprising:
   a bumper reinforcement that is provided in a bumper of a vehicle;
   a reinforced portion that is formed within the bumper reinforcement, and that reinforces the bumper reinforcement; and
   multiple detecting devices that are provided outboard of the reinforced portion, and that detect one of a load and pressure applied to the bumper.

2. The bumper structure according to claim 1, wherein the multiple detecting devices are either load detection sensors that detect magnitude of the load applied to the bumper or touch sensors that detect the load applied to the bumper, which is equal to or higher than a predetermined load.

3. The bumper structure according to claim 1, wherein:
   the multiple detecting devices include a first detecting device and a second detecting device; and
   the second detecting device is provided directly outboard of the first detecting device or provided outboard of the first detecting device with a rigid body interposed between the first detecting device and the second detecting device, and detects one of the load and pressure applied to the bumper.

4. The bumper structure according to claim 3, wherein the rigid body is a load transfer plate that transfers the load applied to the bumper to the first detecting device.

5. The bumper structure according to claim 1, wherein:
   the bumper reinforcement includes a first member and a second member that are provided perpendicularly to a longitudinal direction of the vehicle, and that face each other and are apart from each other; and
   the first member is provided outboard of the second member.

6. The bumper structure according to claim 5, wherein the reinforced portion is a reinforcement member that connects the first member and the second member to each other.

7. The bumper structure according to claim 5, wherein the reinforced portion is formed by partially increasing a thickness of the first member.

8. The bumper structure according to claim 3, wherein the first detecting device is a load detection sensor that detects magnitude of the load applied to the bumper.

9. The bumper structure according to claim 3, wherein the second detecting device is a touch sensor that detects the load applied to the bumper, which is equal to or higher than a predetermined load.

10. The bumper structure according to claim 1, further comprising:
    a rigid body provided in front of a front wall of the bumper reinforcement; and
    an absorber provided between the front wall of the bumper reinforcement and an inner surface of a wall of a bumper cover, wherein:
    the absorber has a substantially U-shaped cross section, wherein an upper projection portion and a lower projection portion of the absorber project toward the rear of the vehicle, and the upper projection portion of the absorber is fixed onto the rigid body above one of the detecting devices, and the lower projection portion of the absorber is fixed onto a lower portion of the front wall of the bumper reinforcement; and
    the absorber contacts the inner surface of the wall of the bumper cover.

11. The bumper structure according to claim 1, wherein the multiple detecting devices are provided at positions on an upper half of the bumper reinforcement.

* * * * *

UNITED STATES PATENT AND TRADEMARK OFFICE
CERTIFICATE OF CORRECTION

PATENT NO. : 7,484,779 B2
APPLICATION NO. : 11/666622
DATED : February 3, 2009
INVENTOR(S) : Hiroyuki Takahashi It is certified that error appears in the above-identified patent and that said Letters Patent is hereby corrected as shown below:

On the Title Page Item (22) should read,

International Filing Date:

May 11, 2006.

Signed and Sealed this

Fourteenth Day of July, 2009

JOHN DOLL
*Acting Director of the United States Patent and Trademark Office*